(12) United States Patent
Tamir et al.

(10) Patent No.: US 11,665,308 B2
(45) Date of Patent: May 30, 2023

(54) SYSTEM AND METHOD FOR RENDERING FREE VIEWPOINT VIDEO FOR SPORT APPLICATIONS

(71) Applicant: Tetavi Ltd., Petach Tiqva (IL)

(72) Inventors: Michael Tamir, Tel Aviv (IL); Michael Birnboim, Holon (IL); David Dreizner, Raanana (IL); Michael Priven, Ramat-Gan (IL); Vsevolod Kagarlitsky, Ramat Gan (IL)

(73) Assignee: TETAVI, LTD., Ramat Gan (IL)

( * ) Notice: Subject to any disclaimer, the term of this patent is extended or adjusted under 35 U.S.C. 154(b) by 43 days.

(21) Appl. No.: 15/879,618

(22) Filed: Jan. 25, 2018

(65) Prior Publication Data
US 2018/0220125 A1 Aug. 2, 2018

Related U.S. Application Data

(60) Provisional application No. 62/452,694, filed on Jan. 31, 2017.

(51) Int. Cl.
*H04N 5/222* (2006.01)
*G06T 15/04* (2011.01)
(Continued)

(52) U.S. Cl.
CPC ......... *H04N 5/2226* (2013.01); *G01B 11/00* (2013.01); *G01B 11/25* (2013.01); *G06T 15/04* (2013.01);
(Continued)

(58) Field of Classification Search
CPC ......... G01B 11/00; G01B 11/25; G06T 15/04; G06T 17/00; G06T 17/20; G06T 19/003;
(Continued)

(56) References Cited

U.S. PATENT DOCUMENTS 4,695,878 A * 9/1987 Levine ............... H04N 5/33
348/216.1
5,206,697 A * 4/1993 Schwartz ............ G01S 7/481
342/131
(Continued)

OTHER PUBLICATIONS

Solony et al.; Scene Reconstruction From Kinect Motion; 2011; electroscope; pp. 1-5.*
(Continued)

*Primary Examiner* — Peter D Le
(74) *Attorney, Agent, or Firm* — M&B IP Analysts, LLC

(57) ABSTRACT

Methods and systems for generating free viewpoint videos (FVVs) based on images captured in a sports arena. A method includes projecting, onto objects within a filming area within the sports arena, a predefined pattern including a large set of features; generating, based on signals captured by each of a plurality of depth cameras, a point cloud for each depth camera, wherein the plurality of depth cameras is deployed in proximity to the filming area, wherein the captured signals are reflected off of the objects within the filming area; creating, based on the plurality of point clouds, a unified point cloud; meshing points in the unified point cloud to generate a three-dimensional (3D) model of the objects; texturing the 3D model based on images captured by the plurality of depth cameras; and rendering the textured 3D model as a FVV including a series of video frames with respect to a viewpoint.

48 Claims, 9 Drawing Sheets

(51) Int. Cl.
*G06T 17/20* (2006.01)
*H04N 13/271* (2018.01)
*H04N 13/279* (2018.01)
*H04N 13/282* (2018.01)
*G01B 11/00* (2006.01)
*G06T 17/00* (2006.01)
*G01B 11/25* (2006.01)
*H04N 13/257* (2018.01)
*H04N 13/25* (2018.01)
*G06T 19/00* (2011.01)

(52) U.S. Cl.
CPC .............. *G06T 17/00* (2013.01); *G06T 17/20* (2013.01); *G06T 19/003* (2013.01); *H04N 13/25* (2018.05); *H04N 13/257* (2018.05); *H04N 13/271* (2018.05); *H04N 13/279* (2018.05); *H04N 13/282* (2018.05); *G06T 2210/56* (2013.01)

(58) Field of Classification Search
CPC .. G06T 2210/56; H04N 13/25; H04N 13/257; H04N 13/271; H04N 13/279; H04N 13/282; H04N 5/2226
See application file for complete search history.

(56) References Cited

U.S. PATENT DOCUMENTS

| | | |
|---|---|---|
| 5,535,288 A | 7/1996 | Chen et al. |
| 5,993,318 A * | 11/1999 | Kousaki .................. A63F 13/10 463/35 |
| 6,055,330 A | 4/2000 | Eleftheriadis et al. |
| 8,051,452 B2 | 11/2011 | Arseneau et al. |
| 8,391,773 B2 | 3/2013 | Arseneau et al. |
| 8,723,956 B2 | 5/2014 | Anderson |
| 8,803,951 B2 | 8/2014 | Gay et al. |
| 8,917,270 B2 | 12/2014 | Sweeney et al. |
| 9,077,866 B2 | 7/2015 | Aagaard et al. |
| 2003/0012277 A1 | 1/2003 | Azuma et al. |
| 2004/0062450 A1 | 4/2004 | Kondo et al. |
| 2005/0018045 A1 * | 1/2005 | Thomas .................. G06K 9/209 348/157 |
| 2005/0057663 A1 * | 3/2005 | Thomas .................. H04N 5/275 348/222.1 |
| 2005/0285874 A1 * | 12/2005 | Zitnick, III ........... G06T 15/205 345/592 |
| 2006/0017835 A1 * | 1/2006 | Jacobsen .............. H04N 19/115 348/345 |
| 2006/0221072 A1 | 10/2006 | Se et al. |
| 2007/0279494 A1 * | 12/2007 | Aman .................... G01S 3/7864 348/169 |
| 2008/0118143 A1 * | 5/2008 | Gordon .............. G01B 11/2513 382/154 |
| 2008/0192116 A1 | 8/2008 | Tamir et al. |
| 2009/0109280 A1 * | 4/2009 | Gotsman .............. H04N 5/2628 348/39 |
| 2009/0167930 A1 | 7/2009 | Safaee-Rad et al. |
| 2009/0172606 A1 | 7/2009 | Dunn et al. |
| 2009/0244062 A1 | 10/2009 | Steedly et al. |
| 2009/0297061 A1 | 12/2009 | Mareachen et al. |
| 2010/0014781 A1 | 1/2010 | Liu et al. |
| 2010/0200752 A1 * | 8/2010 | Lee ...................... H04N 5/2254 250/330 |
| 2011/0128286 A1 | 6/2011 | Park et al. |
| 2012/0230545 A1 | 9/2012 | Zhang et al. |
| 2012/0249802 A1 | 10/2012 | Taylor |
| 2013/0095459 A1 | 4/2013 | Tran |
| 2013/0095920 A1 | 4/2013 | Patiejunas et al. |
| 2013/0147785 A1 * | 6/2013 | Patiejunas ............... G06T 15/04 345/419 |
| 2013/0222369 A1 | 8/2013 | Huston et al. |
| 2013/0321393 A1 | 12/2013 | Winder |
| 2013/0321396 A1 | 12/2013 | Kirk et al. |
| 2013/0321586 A1 | 12/2013 | Kirk et al. |
| 2013/0321593 A1 | 12/2013 | Kirk et al. |
| 2013/0329985 A1 | 12/2013 | Helin |
| 2014/0118482 A1 | 5/2014 | Noh et al. |
| 2014/0176535 A1 | 6/2014 | Krig |
| 2014/0232820 A1 | 8/2014 | Ha et al. |
| 2014/0340404 A1 | 11/2014 | Wang et al. |
| 2015/0123973 A1 * | 5/2015 | Larsen .................... G06T 15/04 345/427 |
| 2015/0243073 A1 | 8/2015 | Chen et al. |
| 2015/0279044 A1 | 10/2015 | Kim et al. |
| 2015/0323672 A1 | 11/2015 | Shenkar et al. |
| 2016/0234475 A1 * | 8/2016 | Courchesne ........... H04N 7/157 |
| 2017/0046833 A1 | 2/2017 | Lurie et al. |
| 2017/0099441 A1 * | 4/2017 | Choi ...................... H04N 5/247 |
| 2017/0154433 A1 | 6/2017 | Takakura |
| 2017/0157512 A1 * | 6/2017 | Long ..................... A63F 13/497 |
| 2017/0270654 A1 * | 9/2017 | Eldar ......................... G06T 7/80 |
| 2017/0316606 A1 * | 11/2017 | Khalid ..................... G06T 17/00 |
| 2018/0005079 A1 * | 1/2018 | Tosic ................. G06K 9/00664 |

OTHER PUBLICATIONS

Collet, et al., "Highly Quality Streamable Free-Viewpoint Video", 34 ACM Transactions on Graphics 4, 2015.
Holoportation, Microsoft Research, https://www.microsoft.com/en-US/research/project/holoportation-3/, last accessed an Jan. 29, 2018.
SWIR Area Cameras, Sensors Unlimited, http://www.sensorsinc.com/products/area-cameras, last accessed Jan. 29, 2018.
Taylor, et al., "Efficient and Precise Interactive Hand Tracking Through Joint, Continuous Optimization of Pose and Correspondences", SIGGRAPH 2016, Anaheim, California, Jul. 2016, pp. 1-12.

* cited by examiner

SYSTEM AND METHOD FOR RENDERING FREE VIEWPOINT VIDEO FOR SPORT APPLICATIONS

CROSS-REFERENCE TO RELATED APPLICATIONS

This application claims the benefit of U.S. Provisional Application No. 62/452,694 filed on Jan. 31, 2017, the contents of which are hereby incorporated by reference.

TECHNICAL FIELD

The present disclosure generally relates to capturing, recording, streaming and displaying free viewpoint videos.

BACKGROUND

Free viewpoint video (FVV) is a designation for the capability of a rendering engine to interactively control the viewpoint while rendering and displaying a video signal. FVV represents one of the most exciting applications of next-generation television, adding a further degree of freedom to the usual way of watching television and, in particular, sports events.

Producers of professional sports events often use multiple passive cameras to broadcast an event. The passive cameras are positioned at different locations to capture different perspectives such as, for example, from different positions and/or angles (e.g., a bird's eye view, a close-up view, and the like). Each passive camera is controlled by a human operator who directs the camera at interesting activities and captures video of the event. To ensure high quality video for all viewpoints that may be selected by the director or human operator, each camera that is used is typically a high-quality passive camera which, consequently, is expensive and can require significant maintenance.

As the number of passive cameras increases, the quality of the event broadcast improves. Accordingly, the number of passive cameras used may be high (e.g., 30 or more cameras), particularly for important events where high quality is desired. For example, at prestigious sporting events such as the World Cup or the Super Bowl, over 70 cameras are used for broadcasting. The combination of the high number of expensive cameras and the fact that they must be human-operated inevitably results in costly and logistically complicated professional sports production.

During the live broadcast of the event, the director switches between different cameras on-the-fly (an action also known as "cutting"). Feeds from all of the cameras are recorded continuously on dedicated servers for replays. After an interesting occurrence (e.g., scoring a goal), the director chooses the interesting cameras and directs the operators of the servers to replay the video from a different captured angle. To achieve additional viewpoints, moveable cameras may be used. Such moveable cameras require human operators and may be more expensive in terms of camera and maintenance costs. To improve the replay experience, some existing solutions allow for a 360-degree replay experience. The 360-degree replay provides a kind of "virtual flying" experience, where a viewer can see a play from every position around or in the pitch. Some solutions further allow users to select the views they would like to see. Such solutions are based on a high number (e.g., between 30 and 40 or more) of standard (passive) cameras deployed around the playing field. This an expensive solution that requires considerable logistical resources. These and related solutions are particularly important for developing fields of augmented reality and virtual reality. Specifically, free viewpoint television (FTV) may allow viewers to control the focus of attention.

Modern audiences demand higher quality viewing than ever before, which has resulted in the desire for high spatial resolution as well as high color and geometry field FVVs. However, this level of quality is challenging due to time, processing, memory, and communication constraints.

In addition to the aforementioned costs of production, the 360-degree multi-(passive) cameras solutions cannot provide immediate replays (within seconds) because of the complexity of the processing. Due to the non-real-time nature of these solutions, they cannot be used for live production nor for instant replays and, instead, may only be used for delayed replays. Another disadvantage of 360-replay solutions is the poor video quality generated by such solutions at most viewpoints.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a free viewpoint video (FVV) based on images captured in a sports arena. The method comprises: projecting, onto objects within a filming area within the sports arena, a predefined pattern including a large set of features; generating, based on signals captured by each of a plurality of depth cameras, a point cloud for each depth camera, wherein the plurality of depth cameras is deployed in proximity to the filming area, wherein the captured signals are reflected off of the objects within the filming area; creating, based on the plurality of point clouds, a unified point cloud; meshing points in the unified point cloud to generate a three-dimensional (3D) model of the objects; texturing the 3D model based on images captured by the plurality of depth cameras; and rendering the textured 3D model as a FVV including a series of video frames with respect to a viewpoint.

Certain embodiments disclosed herein also include a method for generating a free viewpoint video (FVV) based on images captured in a sports arena. The method comprises: generating, based on scanning performed by each of a plurality of depth cameras, a point cloud for each depth camera, wherein the plurality of depth cameras is deployed in proximity to a filming area within the sports arena; creating, based on the plurality of point clouds, a unified point cloud; meshing points in the unified point cloud to generate a three-dimensional (3D) model of the objects; texturing the 3D model based on images captured by the plurality of depth cameras; and rendering the textured 3D model as a FVV including a series of video frames with respect to a viewpoint.

Certain embodiments disclosed herein also include a free viewpoint video (FVV) production system for sports events. The FVV production system comprises: a plurality of depth cameras deployed in proximity to a filming area within a sports arena; and a FVV generator communicatively connected to the plurality of depth cameras; wherein each depth camera is configured to capture signals reflected off of objects within the filming area and an RGB image of the objects; and wherein the FVV generator is configured to: generate, based on reflected signals captured by each of the plurality of depth cameras, a point cloud for each depth camera, create, based on the at least one point cloud, a unified point cloud, mesh points in the unified point cloud to generate a three-dimensional (3D) model of the objects, texture the 3D model based on images captured by the plurality of depth cameras, and render the textured 3D model as a FVV including a series of video frames with respect to a viewpoint.

Certain embodiments disclosed herein also include a system for generating a free viewpoint video (FVV) based on images captured in a sports arena. The system comprises: a processing circuitry; and a memory, the memory containing instructions that, when executed by the processing circuitry, configure the system to: cause projection, onto objects in a filming area within the sports arena, of a predefined pattern including a large set of features; generate, based on signals captured by each of a plurality of depth cameras, a point cloud for each depth camera, wherein the plurality of depth cameras is deployed in proximity to the filming area, wherein the captured signals are reflected off of the objects within the sports arena; create, based on the plurality of point clouds, a unified point cloud; mesh points in the unified point cloud to generate a three-dimensional (3D) model of the objects; texture the 3D model based on images captured by the plurality of depth cameras; and render the textured 3D model as a FVV including a series of video frames with respect to a viewpoint.

Certain embodiments disclosed herein also include a system for generating a free viewpoint video (FVV) based on images captured in a sports arena. The system comprises: a processing circuitry; and a memory, the memory containing instructions that, when executed by the processing circuitry, configure the system to: generate, based on scanning performed by each of a plurality of depth cameras, a point cloud for each depth camera, wherein the plurality of depth cameras is deployed in proximity to a filming area within the sports arena; create, based on the plurality of point clouds, a unified point cloud; mesh points in the unified point cloud to generate a three-dimensional (3D) model of the objects; texture the 3D model based on images captured by the plurality of depth cameras; and render the textured 3D model as a FVV including a series of video frames with respect to a viewpoint.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
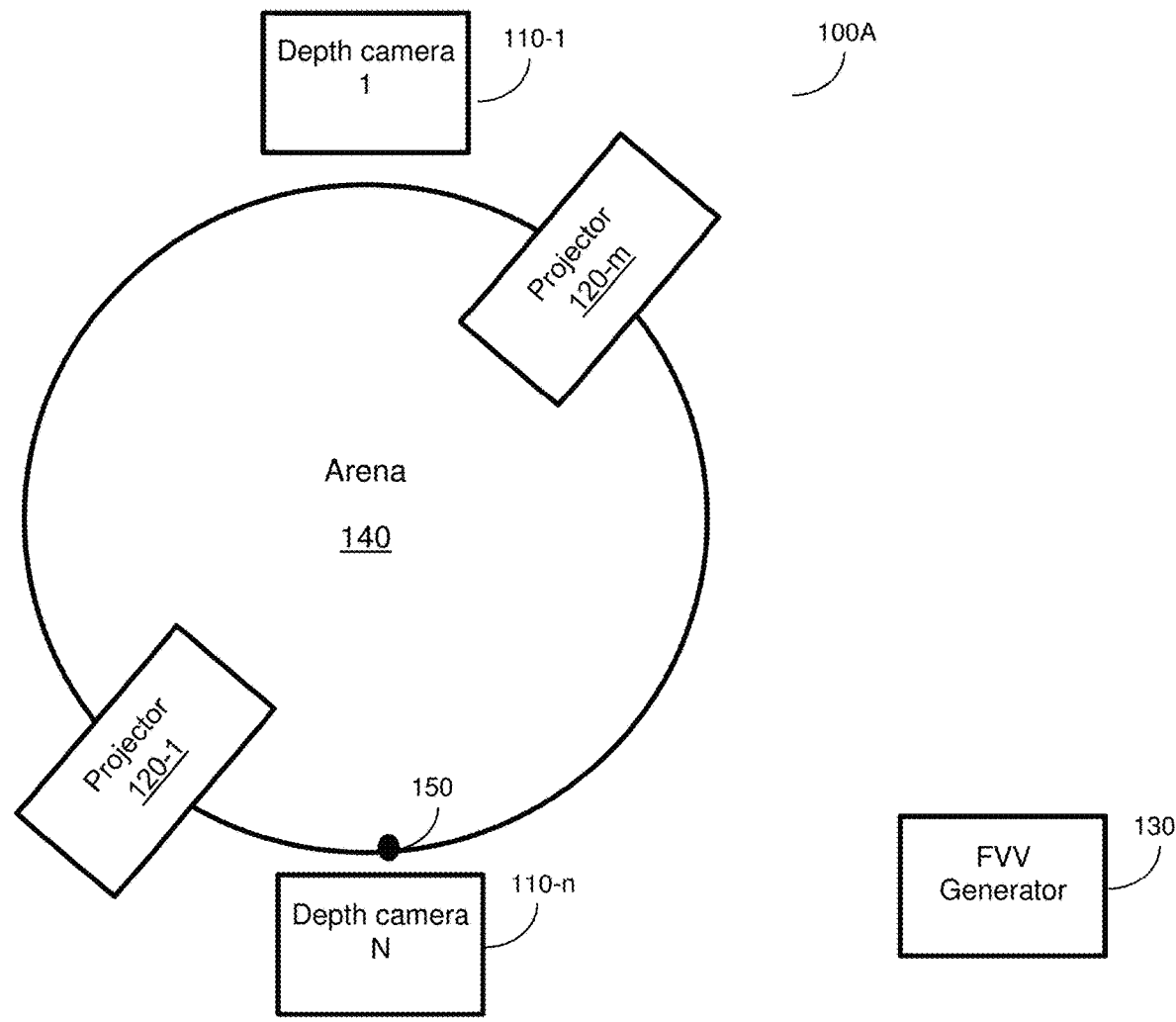
FIG. 1A is a schematic diagram illustrating an arrangement of depth cameras according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for generating high quality free viewpoint videos (FVVs) using a low number of depth cameras. The FVVs may be utilized for sport applications including, by not limited to, replays and sports video production. The disclosed embodiments further allow for real-time FVV processing and rendering of a live broadcast of sports events using a reduced number of cameras. Some disclosed embodiments further allow for improving range of depth cameras to allow for creating FVVs based on larger arenas.

The depth cameras utilized in the rendering of the FVVs in small arenas are based on unstructured light principles. Invisible unstructured light, having a predefined pattern is projected onto the scene. The reflected signals are captured by the depth cameras and processed to render a dynamic three-dimensional (3D) model. The processing includes creating a point cloud, meshing to produce the 3D model, and texture mapping to "paint" the meshed 3D model. The arrangement of the depth cameras and the process for generating the 3D model are discussed in greater detail below.

In an embodiment, the generated dynamic 3D model is rendered as a video from a user's desired viewpoint within a location. Thus, the disclosed embodiments allow for selecting among virtual cameras located within a filming location, where each virtual camera represents a viewpoint from which images could be captured in the filming location. The number of real depth cameras used is discrete, while the number of afforded virtual viewpoints is infinite. Thus, the disclosed techniques further allow for reducing operation costs when broadcasting a live sports events by utilizing virtual cameras that can be positioned anywhere at the discretion of a director.

Figure 1B:
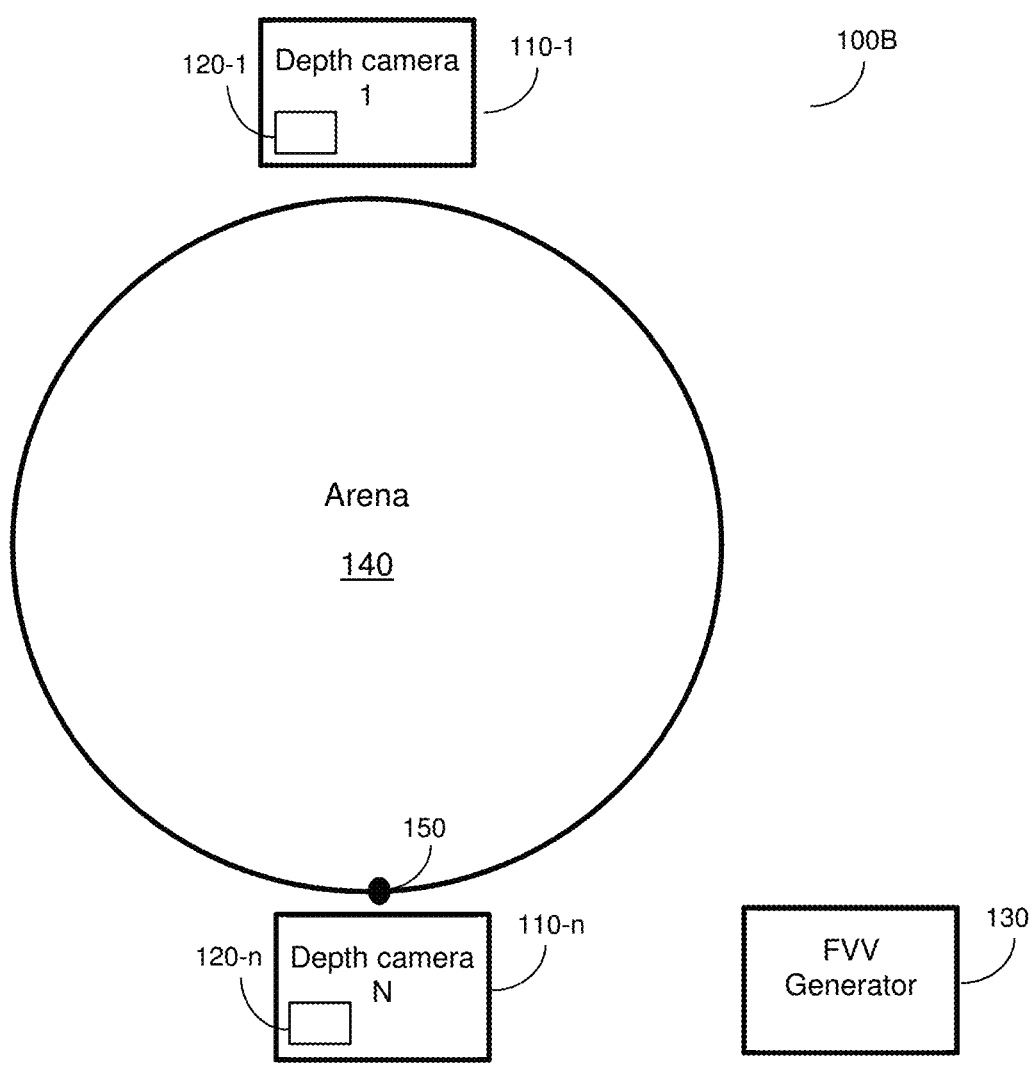
FIG. 1B is a schematic diagram illustrating an arrangement of depth cameras according to another embodiment.

FIGS. 1A and 1B show example schematic diagrams 100A and 100B illustrating example arrangements of a FVV rending system including depth cameras according to various disclosed embodiments. The schematic diagram 100A illustrates depth cameras 110-1 through 110-$n$, where "n" is an integer greater than or equal to 2 (hereinafter referred to individually as a depth camera 110 and collectively as depth cameras 110, merely for simplicity purposes), and projectors 120-1 and 120-*m*, where "m" is an integer greater than or equal to 1 (hereinafter referred to individually as a projector 120 and collectively as projectors 120, merely for simplicity purposes), deployed to capture video based on activities occurring in an arena 140. The images captured by the depth cameras 110 are provided to a FVV generator 130 for creation of FVVs. In an example embodiment, only one (1) depth camera can be utilized to generate the FVV.

The arena 140 may be, for example, a sports arena in which a sporting event to be televised is recorded. Thus, the disclosed embodiments allow for sports replay and video production. Each of the projectors 120 is deployed in proximity to the arena 140 (i.e., in the arena 140 or within a threshold distance of the arena 140). The threshold distance may differ depending on, for example, a type and intensity of light emitted by the projectors 120, a configuration of the depth cameras 110, or both. Examples for sports arenas where the depth cameras can be deployed to produce FVVs include, but are not limited to, arenas used for sports such as boxing, martial arts, badminton, gymnastics, tennis, table tennis, and the like. The type of the depth cameras 110 being deployed are based on a maximum required range of the depth cameras 110 to the scene being filmed or recorded. Various examples are discussed below.

In an embodiment, at least two depth cameras 110 are utilized. In the example implementation shown in FIGS. 1A and 1B, two depth cameras are utilized, although more may be utilized. In a further embodiment, two to sixteen depth cameras 110 are utilized. Images captured by the depth cameras 110 are utilized to render a 3D model of the arena 140 and objects therein, thereby allowing for creating FVVs from the perspective of "virtual cameras" that may be located according to, for example, a director's or other user's discretion. Each virtual camera represents a perspective from in or around the arena 140, and may be associated with a viewpoint (i.e., a location and pose) capturing activities occurring in the arena 140. Accordingly, footage from two to sixteen depth cameras may be utilized to effectively allow for an infinite number of virtual cameras.

Each depth camera 110 includes a RGB camera and a pair of black-and-white (B/W) cameras (not shown in FIG. 1). The RGB camera provides the three basic color components, i.e., red, green, blue. The B/W cameras are configured to detect light emitted by the projectors 120 and reflected from objects in the scene and each includes a spectral filter (not shown). The type of filter in each B/W camera depends on the type of light source of projectors 120 utilized. For example, filters used for near infrared laser or LEDs projectors transmit most of the reflected source infrared radiation and reject the ambient illumination thus increasing the signal to noise ratio in the cameras. In other example embodiments, each B/W camera may be configured with multiple types of filters including, but not limited to, an interference (dichroic) filter, a bandpass filter, a combination of shortpass and longpass filters, and the like. In an example embodiment, the RGB and B/W cameras may be low resolution or otherwise low quality, inexpensive cameras.

In an embodiment, one or more projectors 120 are utilized. In the example implementation shown in FIG. 1A, the projectors 120 are deployed separately from the depth cameras 110 in proximity to the arena 140. In an alternative implementation shown in FIG. 1B, the depth cameras 110 may include the projectors 120.

Each projector 120 is utilized for producing local features with respect to the area of interest to facilitate the spatial correlation operation performed for the calculation of depth maps. That is, local features may be known patterns projected onto the surface of objects in the arena 140. To this end, each projector 120 is configured to project invisible light on objects in the arena 140. In an example embodiment, the light source of a projector 120 may be, but is not limited to, a laser (with an eye-safety mechanism or operating at an eye safe distance), a light-emitting diode (LED), or a standard projector lamp. The projected light is reflected off of the objects and captured by the B/W cameras included in the depth cameras 110, thereby allowing for determination of depth maps thereon.

Each projector 120 is typically located as close as possible to the areas that may be filmed within the arena 140 to increase the radiation intensity hitting the scene, thereby allowing for increased range of the depth cameras 110, i.e., further distance between each depth camera 110 and a far end of the arena 140 without an unsuitable drop in quality. In the example implementation shown in FIG. 1A, a point 150 of the arena 140 is located at the far end the depth camera 110-1.

In some arrangements, the type, number, or both, of the projectors 120 and, consequently, the filters used with the B/W cameras of the depth cameras 110, may depend on the filming location, i.e., the arena 140. That is, the type and number of projectors 120 may be based on the size of an arena for which FVVs are made such that projector configurations providing higher quality 3D models may be utilized for larger areas. The size may be with respect to a distance between each depth camera 110 and the far end of the arena (e.g., the far end 150 of the depth camera 110-1). Example implementations include using projectors based on LEDs for a distance between 2 and 20 meters to the far end of the arena. In order to further increase the range of the depth cameras, LIDAR scanners can be integrated in the depth cameras for a distance between 20 and 200 meters to the far end of the arena.

In some implementations, each of the projectors 120 may include an eye safe laser or LED source. In an embodiment, a laser emitting radiation in the 1.5-2 microns spectral band is used. Such laser is safe to the human eye and, thus, a much higher radiation intensity may be used to project the pattern without causing harm to humans in the arena 140. As such, the distance of the projector 120 and the depth cameras from the arena can be increased. In such an implementation, the depth cameras 110 includes a pair of cameras (instead of the B/W cameras) sensitive to such spectral bands, for example InGaAs cameras with lenses adapted to this wavelength. Further, in some implementations, auto-tuning using other depth cameras 110 may be utilized to reduce the size of the field of view needed to be captured by each depth camera 110.

In some other implementations, each projector 120 utilizes an extended source of light. Use of an extended source in the visible or near infrared spectrum increases the minimum permissible energy on a human eye positioned at a distance from the projector 120. Thus, such a projector extends the eye safe distance and enables increasing the source intensity, and thus increased range of the depth cameras 110, i.e., further distance between each depth camera 110 and a far end of the arena 140 without an unsuitable drop in quality. As an example, such a distance may be up to 20 meters. In one example, the extended source is an array of LEDs at an extended source configuration.

Figure 1C:
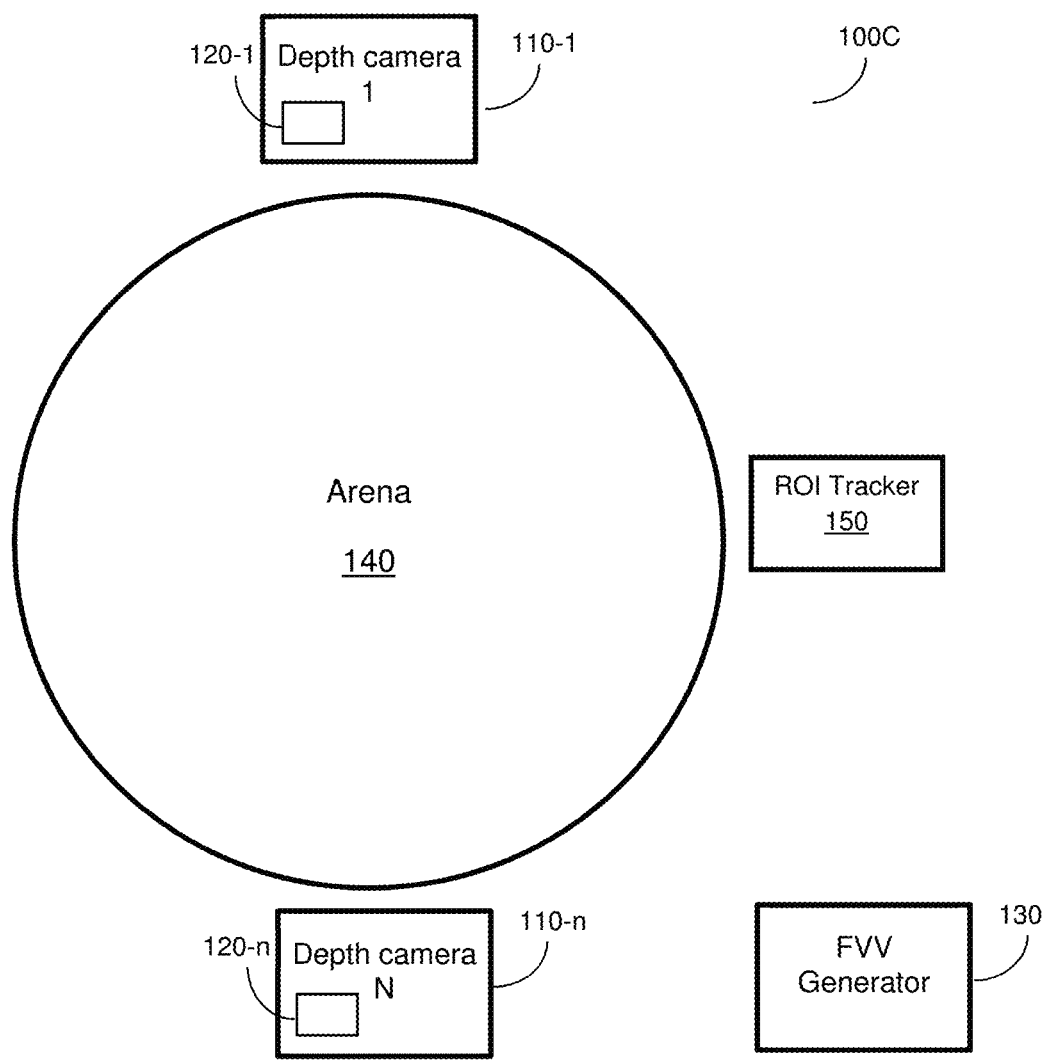
FIG. 1C is a schematic diagram illustrating another arrangement of depth cameras according to yet another embodiment.

FIG. 1C is an example schematic diagram 100C illustrating yet another implementation of the disclosed embodiments. In the example schematic diagram 100C, a Region of Interest (ROI) tracking module (ROI tracker) 150 is further located in proximity (e.g., within a threshold distance) to the arena 140. In this implementation, each depth camera 110 includes a LIDAR scanner, for example as shown in FIG. 3C. The ROI tracker 150 is configured to dynamically track instantaneous ROIs in a filming area of the arena 140. It should be noted that a single ROI tracker 150 serving all of the depth cameras 110 is shown in FIG. 1C merely for example purposes, and that multiple ROI trackers may be equally utilized without departing from the disclosed embodiments. The ROI trackers may be implemented in the depth cameras 110, or may be mounted separately from the depth cameras 110.

It should be noted that the example implementations shown in FIGS. 1A-1C are non-limiting, and that other numbers of depth cameras 110, projectors 120, ROI trackers 150, or a combination thereof, may be equally utilized consistent with the disclosed embodiments. Additionally, the arena 140 may be a small arena (e.g., an arena used for sports such as martial arts, badminton, tennis, table tennis, etc.) or a large arena (e.g., an arena for ice-skating, ice-hockey, basketball, etc.). Further, the FVV generator 130 may be remotely located and communicate with the depth cameras over a network such as, but not limited to, a WAN, the Internet, and the like. In yet another embodiment, the processing as performed by the FVV generator 130 may be distributed among any or all of the various depth cameras.

Figure 2:
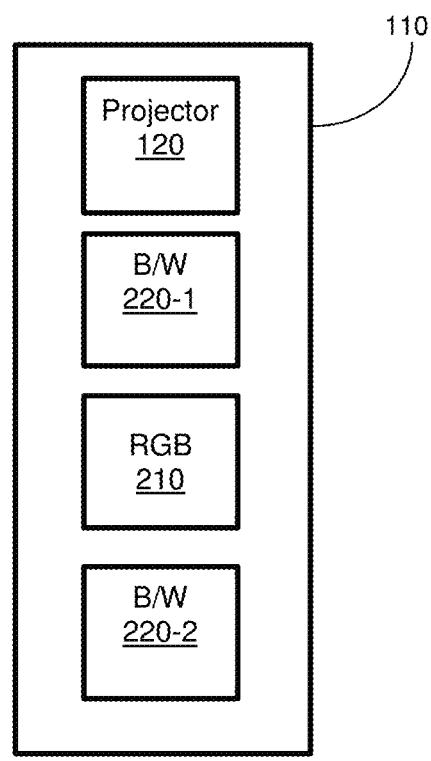
FIG. 2 is a schematic diagram of a depth camera utilized in the arrangement shown in FIG. 1B according to one embodiment.

FIG. 2 shows an example schematic diagram of the depth camera 110 according to an embodiment. The example depth camera 110 shown in FIG. 2 includes a RGB camera 210, B/W cameras 220-1 and 220-2, and a projector 120. Thus, in the implementation shown in FIG. 2, the projectors 120 are integrated in the depth cameras 110 as shown in FIG. 1B rather than separately from the depth cameras 110 as shown in FIG. 1A. Example schematic diagrams illustrating depth cameras 110 that do not include the projectors 120 are described further herein below with respect to FIGS. 3A-3C.

In the example implementation shown in FIG. 2, the depth camera 110 includes a pair of B/W cameras 220-1 and 220-2. Additionally, in the implementation shown in FIG. 2, the RGB camera 210 is placed between the B/W cameras 220.

In an embodiment, signals are captured by the RGB and B/W cameras of the depth cameras 110. Each of the depth cameras 110 produces a view depth map, using signals reflected from the objects being illuminated by the projector 130. Specifically, a depth map (or "local" point cloud) is generated based on signals captured by the B/W cameras 220-1 and 220-2. Specifically, the B/W cameras provide a depth per pixel or per feature, which may be viewed as a three-dimensional point per pixel or per feature. An example embodiment for generating a depth map is described below.

In an embodiment, the depth maps produced from different depth cameras are unified, improved, and processed to reduce noise using samples from the RGB camera 210. In a further embodiment, the improvement is achieved using a passive triangulation. In another embodiment, the improvement may include a gating procedure. During the gating procedure, exposure of the RGB camera and the pulse emitted by the projector (including a laser source) are significantly shorter than 1 video frame time.

In addition, each depth camera 110 produces a high resolution RGB image, using the RGB camera 210, of a scene including a portion of the arena 140. The mesh generated from the unified point cloud is texturized using images captured by the RGB camera 210. That is, the 3D model is painted using textures captured by the RGB camera. The "painted" 3D model may be rendered from a viewpoint selected by, for example, a user such as a viewer or director. Additionally, a "continuous flight" experience is afforded. in this feature a continuously moving virtual camera provides frame-by-frame rendering, each frame from another viewpoint along a predetermined or currently specified path.

In another embodiment, the FVV rendering system disclosed herein can be utilized for a live production system. The production allows a director "cut", during the live action, to a virtual camera viewpoint. The location and pose of a virtual camera viewpoint may be predetermined or arbitrarily determined during the live action.

Figure 3A:
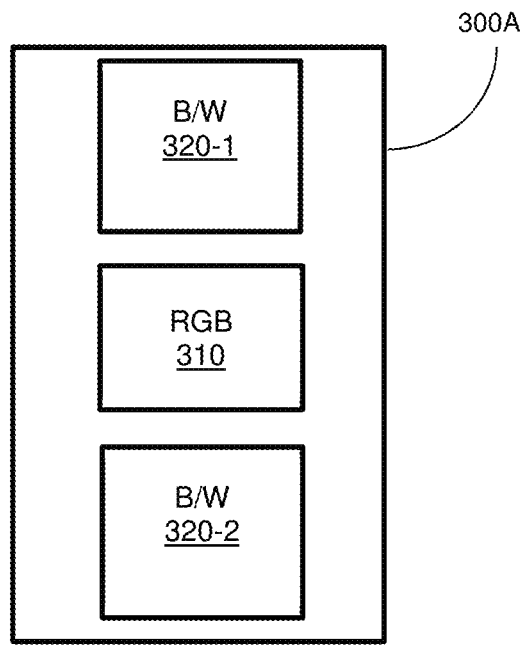
FIGS. 3A-3C are schematic diagrams of depth cameras utilized according to other embodiments.
Figure 3B:
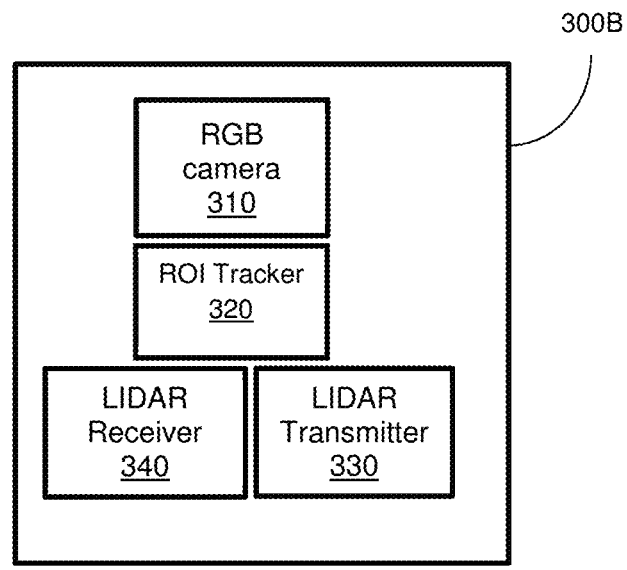
Figure 3C:
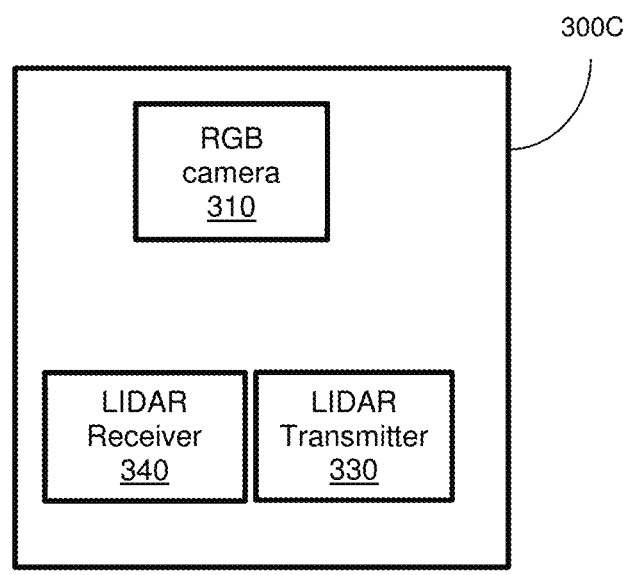

FIGS. 3A-3C are schematic diagrams of example depth cameras according to other embodiments. FIG. 3A shows an example depth camera 300A including a RGB camera 310 and a pair of B/W cameras 320-1 and 320-2. In the example implementation shown in FIG. 3A, the projectors 120 are not included in the depth camera 300A and, instead, are deployed in proximity to the arena 140 as shown in FIG. 1A. It should be noted that the embodiments disclosed herein are not limited to utilization of B/W cameras in the depth camera 110. Specifically, any optical sensing device or camera that can detect the projected features can be used without departing from the disclosed embodiments.

FIG. 3B shows an example depth camera 300B according to another embodiment. The camera 300B is utilized for generating FVVs in large arenas. As an example, a large arena may be American Football field, a soccer field, and the like, where the range to the far end of the scene is typically 100-200 meters.

The depth camera 300B includes a RGB camera 310, a Region of Interest (ROI) tracking module (ROI tracker) 320, a LIDAR scanner including a transmitter 330 and a receiver 340. The transmitter 330 and the receiver 340 may be mounted on a mechanical scanner unit (not shown). The module 340 is configured to dynamically identify and track the instantaneous ROIs on the pitch. Typically, in sports events, the ROI would be around the ball or a gathering of a group of players. The LIDAR scanner is configured to momentarily scan areas designated as ROIs by the module 340. The scanning is performed using a Time of Flight (TOF) technique. The LIDAR scanning results are utilized to create a point cloud (or depth map) for the designated ROI at the current video frame.

FIG. 3C is an example depth camera 300C according to yet another embodiment. The depth camera 300C includes a RGB camera 310 and a LIDAR scanner including a transmitter 330 and a receiver 340. In the example implementation shown in FIG. 3C, a ROI tracker is not included in the depth camera 300C. One or more ROI trackers may be deployed in proximity to the filming area, for example as shown in FIG. 1C. Thus, each ROI tracker may be mounted separately to the depth camera 300C.

Figure 4:
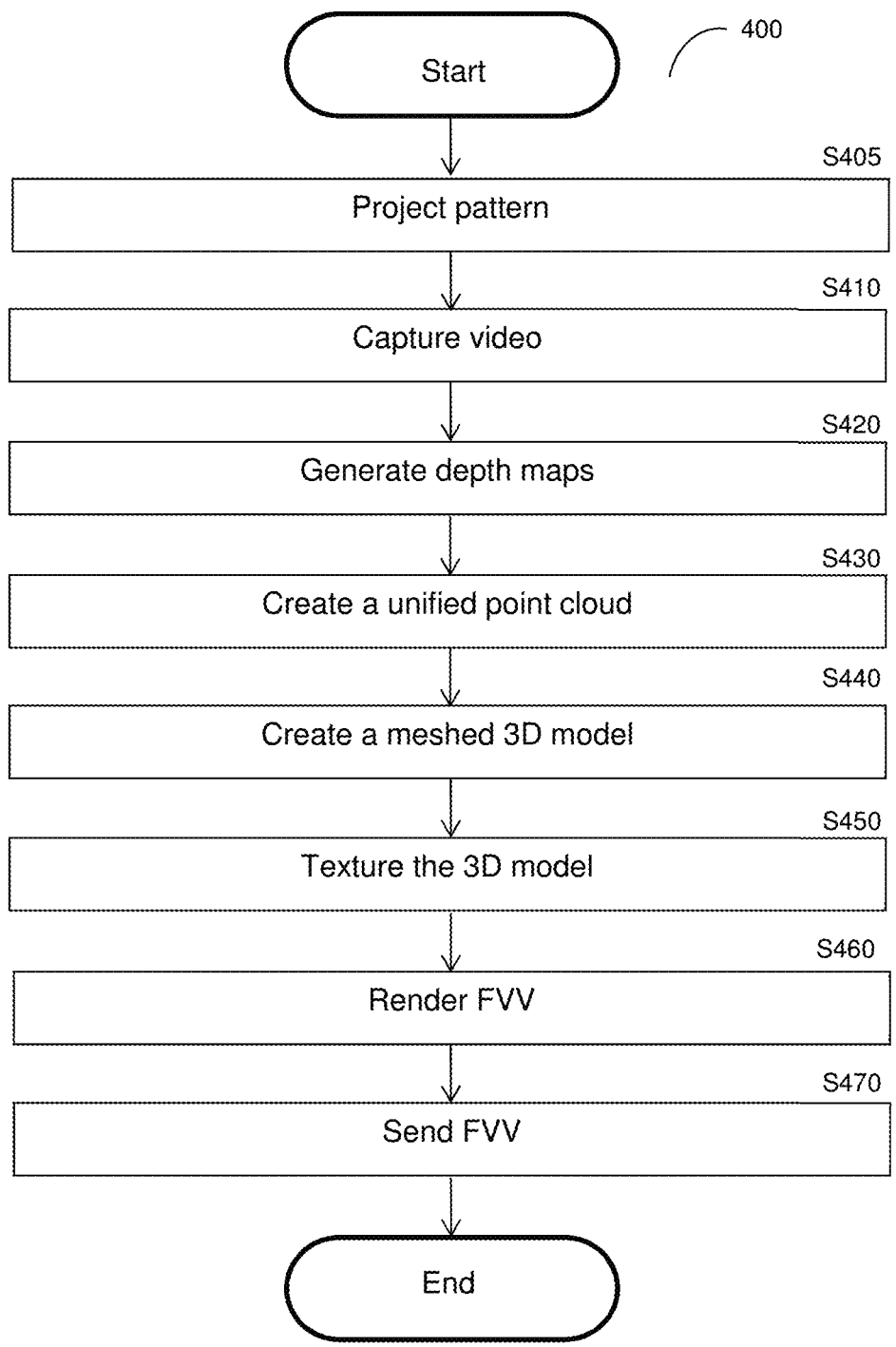
FIG. 4 is a flowchart illustrating a method for rendering free viewpoint videos according to an embodiment.

FIG. 4 is an example flowchart 400 illustrating a method for rendering FVVs according to an embodiment. In an embodiment, the method is performed by the FVV generator 130, FIGS. 1A-1B.

In an embodiment, prior to the execution of the method or upon an initial setting of the depth cameras in the arena, the depth cameras are calibrated. The calibration may include, but is not limited to, causing each depth cameras to synchronize on anchor points, identifying such anchor points, and calibrating each camera with respect to the other cameras using the identified points. The anchor points are points on an object placed in front of the cameras. The object may have a predefined pattern. For example, the object may include a checkerboard with squares arranged in alternating black and white colors. This type of calibration may be useful when the depth cameras are stationary.

Optionally, for non-stationary depth cameras, the calibration is performed using a dynamic calibration process. In some implementations, non-stationary depth cameras can be used for monitoring (tracking) of objects. The dynamic calibration is utilized to detect very small movements of the depth cameras (e.g., due to crowd cheering or vibrations). In an embodiment, the initial calibration points are registered. Then, during the dynamic calibration process, the locations of the initial calibration points are compared to newly detected calibrated points, and the calibration perturbation is computed respective thereof.

At S405, the projectors deployed in the arena are triggered to project a pattern onto objects in the arena. Each projected pattern includes a large set of features that are spatially unique. At S410, video is captured via the depth cameras. The video may include signals that were reflected off of objects and filtered by the B/W cameras (using their respective filters) and reflected ambient illumination captured by the RGB and B/W cameras.

At S420, a depth map or a "local" point cloud is generated based on signals reflected from the illuminated objects and captured by the pair of B/W cameras in each depth camera. The depth map is generated by measuring the distance for each feature as observed by the pair of B/W cameras. Each B/W camera, in a depth camera, would present the feature at a different pixel location, thus based on the known distance between the B/W cameras, the distance to the feature can be calculated. The various distances computed for the sets of features would create the depth map and points cloud. It should be noted that the projected pattern typically includes millions of features. The output of S420 is depth maps ("local" point clouds) generated based on signals from each depth camera.

At S430, the various depth maps are unified into a single point cloud. This is performed using the information derived during the calibration process. That is, the various generated depth maps are merged with respect to the anchor points identified for each depth camera.

At S440, points in the united point cloud are meshed to create a 3D model. The 3D model represents a reconstructed scene (e.g., objects and their movement). To create the 3D model, the points of the unified point cloud are first meshed using a meshing process in key-frames for every frame. The meshing process may be performed using, for example, a Poisson mesh algorithm. The meshing process results with a meshed model (e.g., a polygon or triangle mesh), describing the surface of a model using, for example, triangles. Then, the movement of the meshed model is determined. This is performed by determining how the meshed model moves in the frames between two consecutive key-frames. The determination is based on the movement that best corresponds to a frame in the point cloud under continuity constraints.

In an embodiment, the movement of an object is defined with respect to its joints and its movement is being represented as the movement of the joints. In another embodiment, the created model ensures a high temporal resolution. To this end, tracking of the object's movement may be performed by frequently sampling times in which the object is substantially static (i.e., with little or no movement). An object may be substantially static if the movements of the object are below a predetermined threshold as determined with respect to, for example, a number of movements, distances moved, amount of rotation of joints, a combination thereof, and the like. The movement of the object can be predicted based on a current location and previous locations. Specifically, when the object is close to the camera, more details on the object can be learned, where such details are used to predict the movements of the object when it is far from the camera.

At S450, the meshed 3D model is textured. In an embodiment, each surface in the meshed model (or a triangle mesh) is mapped to one or more pixels in the RGB image captured by the RGB cameras. That is, S450 includes painting the meshed 3D model using textures captured by one or more RGB cameras with respect to the same surface or area. In some implementations, surfaces or areas not captured by the RGB cameras are painted based on considerations of continuity in time and space. That is, surfaces painted in the past will retain the same texture and areas adjacent to such surfaces may be assigned the same texture. The texture mapping can be achieved using conventional techniques discussed in the related art.

Figure 5:
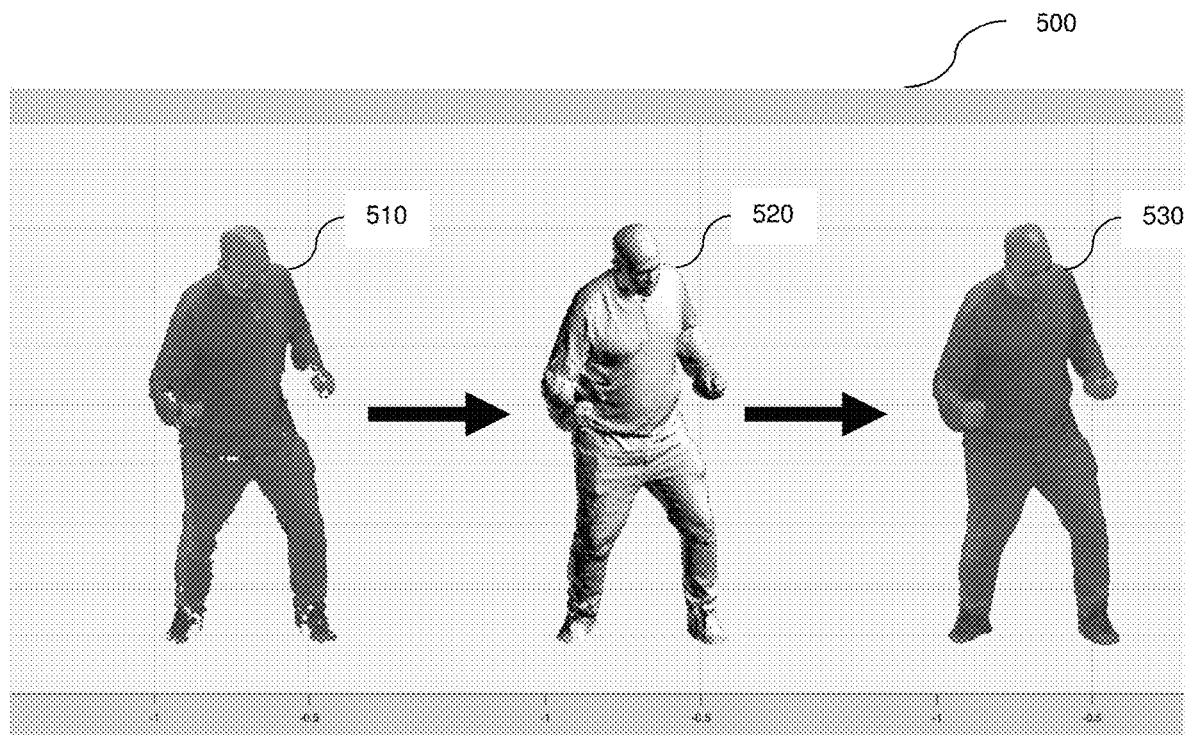
FIG. 5 shows example illustrations demonstrating various stages during the process for generating FVVs.

FIG. 5 shows example illustrations demonstrating various stages during the process for generating FVVs in accordance with at least some of the embodiments described in FIG. 4. The example implementation shown in FIG. 5 illustrates creation of a textured model 530 from a unified point cloud (visually represented as 510) via a meshed 3D model 520. The point cloud 510 is generated based on inputs from the B/W cameras. The 3D model 520 is created by meshing the points in the point cloud 510. The meshed 3D model 520 is textured using texture mapping based on images from the RGB cameras to create the textured model 530.

Returning to FIG. 4, at S460, the textured 3D model is rendered as a series of video frames from a viewpoint, thereby providing footage from a virtual camera. The viewpoint may be selected by a user such as a viewer or director. In an embodiment, video frames are rendered to provide a "continuous flight" experience around the zone of interest and to provide changing of the video perspective from frame to frame according to the flight trajectory formula selected by the user. The rendered video is a FVV that can be displayed or edited using the various applications discussed herein below.

At S470, the FVV is sent to one or more recipient devices. The recipient devices may be, for example, data sources (e.g., data sources storing content for delivery to user devices), user devices, and the like. The user devices may be, but are not limited to, smart televisions, tablet computers, smartphones, laptop computers, desktop computers, VR headset, and other devices configured for receiving and displaying FVVs. In an embodiment, S470 may include uploading the FVV to one or more servers (e.g., one or more content hosting servers accessible over the Internet or other networks). The uploaded FVV may be downloaded by users via user devices by accessing the data sources. In another embodiment, the FVV can be uploaded or transmitted to a control system in a production control room or studio control room.

In an embodiment, the FVV may be sent for display with respect to a user interface on a user device. The user interface may have selectable options for FVVs, for example, predetermined virtual cameras (i.e., viewpoints including predetermined combinations of angles and positions) that the user may select from. The selectable options may further include predetermined camera movements (e.g., pan, zoom, predetermined camera locations, virtual fly trajectory, etc.) that the generated FVV should include. When a FVV option is selected, a FVV meeting the option may be generated and sent to the user device.

In various implementations, the FVV may be displayed along with sound simulated from the location at which the FVV was captured. In an embodiment, the sound may be changed based on the viewpoint of the FVV. For example, the sound used may be different depending on the viewing angle of the FVV. Changing the sound may include, for example, synthesizing the sound from microphones located, for example, a closest angle, location, or both, to the selected virtual camera's angle and location). In another implementation, changing the sound may include modifying sound parameters (i.e., pitch, tone, loudness, etc.), both, and the like.

In some implementations, an artificial intelligence (AI) program may be trained to act as a "virtual cameraman" that selects virtual cameras based on, for example, a type of activity occurring in the filming location (e.g., a type of play in a sports event such as a scored goal in soccer), a location of the activity (e.g., a particular yard line or marked location on a field), a time of the event (e.g., halftime), a combination thereof, and the like. The AI program may be trained based on historical selections made by users (e.g., directors) during previous filming.

In some implementations, the FVV may be sent to a user device directly on-demand, for example when a user requests (e.g., through the user interface of the user device) an instant replay from a particular viewpoint, for example by selecting a virtual camera associated with the viewpoint. Thus, the disclosed embodiments allow for individualized FVVs sent directly to user devices for home streaming. For example, a particular play in a boxing match may be requested from an angle and position by selection of a virtual camera via a user interface on a smart television (TV) in the user's home, and an FVV for an appropriate viewpoint may be generated and sent to the smart TV.

In an embodiment, S470 may further include compressing the rendered FVV to allow efficient transportation via a network (e.g., the Internet) and, in particular, to increase speed for real-time transmission of the FVV. In an embodiment, the compression ratio is high for areas with low interest and the compression ratio is low for areas with high interest. To this end, in an embodiment, S470 may include determining whether each portion of the FVV is of high interest or of low interest. Rules for determining whether a portion is high or low interest may be predefined with respect to, for example, background versus foreground, predetermined features of interest (e.g., certain body parts or objects), both, and the like.

In some embodiments, human poses (skeletons) can be detected based on the RGB images, the point cloud, or both. A detected skeleton can be utilized to improve or adjust the meshing process, adjust the movement of the model by assigning degrees freedom to known joints, and adjusting compression ratio for features of interest.

Figure 6:
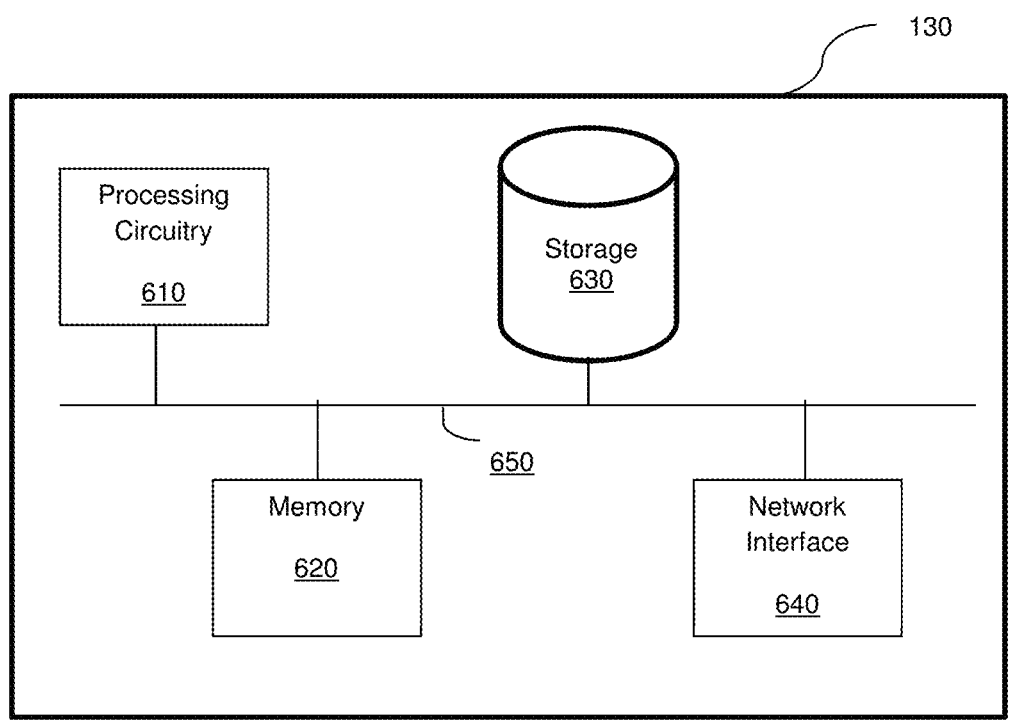
FIG. 6 is a schematic diagram of a FVV generator according to an embodiment.

FIG. 6 is an example schematic diagram of the FVV generator 130 according to an embodiment. The FVV generator 130 includes a processing circuitry 610 coupled to a memory 620, a storage 630, and a network interface 640. In another embodiment, the components of the FVV generator 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, configure the processing circuitry 610 to perform the various processes described herein.

The storage 630 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the FVV generator 130 to communicate with the depth cameras 110, one or more user devices, one or more servers hosting recorded FVV content, or a combination thereof, for purposes such as receiving inputs from depth cameras, sending FVV renders for display, and the like.

It should be understood that the embodiments described herein are not limited to the specific architecture illustrated in FIG. 6, and other architectures may be equally used without departing from the scope of the disclosed embodiments.

Given the depth per pixel produced according to the disclosed embodiments, the number of depth cameras deployed at a filming location may be significantly reduced as compared to existing solutions. Thus, 2 to 16 depth cameras may be utilized as opposed to, for example, 30 or more depth cameras that would be utilized for comparable performance in existing solutions. Additionally, the number of computing components (e.g., servers, communication components, and other accessories) and the amount of computing resources required by those computing components to process the data is reduced. Thus, the disclosed embodiments allow for simpler installation and less expensive operation of depth cameras. Furthermore, the FVV rendered by the disclosed embodiments are higher quality than existing solutions.

Additionally, the disclosed embodiments allow for calculation and rendering of the FVV in real-time within seconds of capturing signals used to produce the FVVs. As such, replays can be viewed immediately after the event, in contrast to existing solutions, which may require a duration of tens of seconds or even minutes to produce a clip in the replay. Moreover, real-time rendering allows the director to select, in live broadcast, the viewpoint (or virtual camera) and to produce a broadcast from multiple virtual cameras placed at will. The director can also decide on the location of the virtual camera at a certain point of interest based on the occurrence. The virtual cameras therefore can provide a video of an event from any desired viewpoint.

Further, the depth cameras do not need to be moved during filming, as "movement" of the cameras (e.g., pan, changing elevation, zoom, etc.) may be replicated by switching among virtual cameras.

FVVs created using the disclosed embodiments may have a large number of potential viewpoints using a low number of simple and relatively inexpensive cameras. This allows for lower costs with respect to installation and maintenance as compared to some existing solutions. The created FVVs may be utilized to provide, for example, production suite for live sporting events, offering even greater value replays as mentioned above. The benefits of the disclosed embodiments may be suitable for use in a variety of applications. Example applications of the disclosed embodiments follow.

In an example implementation, the disclosed embodiments can be utilized for production suites for live events at any viewpoint. For example, the disclosed embodiments can be utilized for sporting events and, in particular, for instant replays from perspectives that are different from the original viewpoint shown to viewers. The disclosed embodiments can be utilized to produce instant and continuous replays from any viewpoint. The disclosed embodiments can be further utilized to provide separation between the background and the zone of interest. The separation may be performed using a distance key.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination thereof. The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

What is claimed is:

1. A method for generating a free viewpoint video (FVV) based on images captured in a sports arena, comprising:

projecting, onto objects within a filming area within the sports arena, a predefined pattern including a large set of features;

generating, based on signals captured by each of a plurality of depth cameras, a point cloud for each depth camera, wherein the plurality of depth cameras is deployed in proximity to the filming area, wherein the captured signals are reflections off of the objects within the filming area of the projected features of the predefined pattern and are distinct from a red-green-blue (RGB) image captured by each respective one of the depth cameras;

creating, based on the plurality of point clouds and anchor points identified for each depth camera during a calibration process, wherein each anchor point is a point on an object placed in front of at least two of the plurality of depth cameras and wherein at least one anchor point of each object has inherently a predefined detectable pattern such that detection of each predefined detectable pattern is possible without employing any of the captured signals that are reflections of any projected feature projected on each anchor point, a unified point cloud, wherein creating the unified point cloud employs image information from at least one black and white (BW) camera of at least one of the plurality of depth cameras;

meshing points in the unified point cloud to generate a three-dimensional (3D) model of the objects; texturing the 3D model based on images captured by at least one red-green-blue (RGB) camera of each of the plurality of depth cameras; and rendering the textured 3D model as a FVV including a series of video frames with respect to a viewpoint;

wherein the depth cameras are unmoving during at least an initial portion of the calibration process and after at least the initial portion of the calibration process during which an initially detected location of at least one of the anchor points is stored, dynamically calibrating the plurality of depth cameras to compensate for small location perturbations of at least one of the plurality of depth cameras by comparing a subsequent detected location of the at least one of the anchor points with the stored initially detected location of the at least one of the anchor points to determine a calibration perturbation.

2. The method of claim 1, wherein each depth camera comprises: a pair of pattern sensing cameras for capturing the reflected signals and wherein the image information from the at least one red-green-blue (RGB) camera is utilized for the texturing.

3. The method of claim 2, wherein the pattern sensing cameras are black/white cameras with filters adapted to a spectral band of the projected pattern.

4. The method of claim 1, wherein the projection of the predefined pattern is performed by at least one projector.

5. The method of claim 4, wherein a distance at which each of the plurality of depth cameras can capture signals reflected off of the objects in the filming area is based on a light source utilized by the at least one projector.

6. The method of claim 5, wherein the light source is a light emitting diode (LED), wherein the distance from each depth camera to a respective far end of the filming area is at most 20 meters.

7. The method of claim 5, wherein the light source is an extended source.

8. The method of claim 5, wherein the light source is an eye safe laser having a spectral band of between 1.5 and 2 microns.

9. The method of claim 1, further comprising: rendering the textured 3D model as a continuous sequence of viewpoints along a predetermined path.

10. The method of claim 9, further comprising: producing instant replays from any viewpoint from the continuous sequence of viewpoints.

11. The method of claim 1, further comprising: providing a live producing system allowing for switching during a live event to at least one selected viewpoint, wherein each viewpoint represents a virtual camera having at least a predetermined location and pose.

12. The method of claim 11, further comprising: changing a sound based on a location of the at least one selected viewpoint.

13. The method of claim 11, further comprising: automatically selecting the at least one viewpoint based on a trained artificial intelligence (AI) model, the viewpoint being selected substantially concurrently with the rendering of the FVV as the series of video frames and the AI model having been trained based on historical selections made by at least one user during production of a previous FVV.

14. The method of claim 11, wherein the at least one selected viewpoint is determined based on at least one user input.

15. The method of claim 1, further comprising: sending, in real-time during a sports event, the FVV to at least one recipient device.

16. The method of 1, further comprising: compressing the FVV based on a compression ratio, wherein the compression ratio is high for areas of low interest, wherein the compression area is low for areas of high interest.

17. The method of claim 1, wherein a number of depth cameras of the plurality of depth cameras is between 2 and 16.

18. The method of claim 1, further comprising: detecting a human skeleton in any of the plurality of point clouds and the images utilized for the texturing; and
adjusting, based on the detected human skeleton, the meshing of the points in the unified point cloud.

19. A non-transitory computer readable medium having stored thereon instructions for causing a processing circuitry to execute the method of claim 1.

20. A method for generating a free viewpoint video (FVV) based on images captured in a sports arena, comprising:
generating, based on scanning performed by each of a plurality of depth cameras, a point cloud for each depth camera, wherein the plurality of depth cameras is deployed in proximity to a filming area within the sports arena, wherein the captured signals are reflections off of objects within the filming area of projected features of a predefined pattern and are distinct from a red-green-blue (RGB) image captured by each respective one of the depth cameras;
creating, based on the plurality of point clouds and anchor points identified for each depth camera during a calibration process, wherein each anchor point is a point on an object placed in front of at least two of the plurality of depth cameras and wherein at least one anchor point of each object has inherently a predefined detectable pattern such that detection of each predefined detectable pattern is possible without employing any of the captured signals that are reflections of any projected feature projected on each anchor point and, correspondingly, identification of each of the at least one anchor point is made without use of any of the captured signals that are reflections of any projected feature projected on each anchor point, a unified point cloud, wherein creating the unified point cloud employs image information from at least one black and white (BW) camera of at least one of the plurality of depth cameras;
meshing points in the unified point cloud to generate a three-dimensional (3D) model of the objects; texturing the 3D model based on images captured by at least one red-green-blue (RGB) camera of each of the plurality of depth cameras; and
rendering the textured 3D model as a FVV including a series of video frames with respect to a viewpoint;
wherein the depth cameras are unmoving during at least an initial portion of the calibration process and after at least the initial portion of the calibration process during which an initially detected location of at least one of the anchor points is stored, dynamically calibrating the plurality of depth cameras to compensate for small location perturbations of at least one of the plurality of depth cameras by comparing a subsequent detected location of the at least one of the anchor points with the stored initially detected location of the at least one of the anchor points to determine a calibration perturbation.

21. The method of claim 20, wherein each depth camera includes a light detection and ranging (LIDAR) scanner and wherein the image information from the at least one red-green-blue (RGB) camera is utilized for the texturing.

22. The method of claim 21, further comprising: dynamically tracking, by at least one ROI tracking module located in proximity to the filming area, instantaneous ROIs in the filming area; scanning, by each LIDAR scanner, an area of each designated ROI; and creating, based on the scanning, the point cloud for each designated ROI at a current video frame.

23. The method of claim of 20, wherein the distance from each depth camera to a respective far end of the filming area is at most 200 meters.

24. A non-transitory computer readable medium having stored thereon instructions for causing a processing circuitry to execute the method of claim 20.

25. A free viewpoint video (FVV) production system for sports events, comprising:
a plurality of depth cameras deployed in proximity to a filming area within a sports arena; and
a FVV generator communicatively connected to the plurality of depth cameras;
wherein each depth camera is configured to capture signals that are (i) reflections off of objects within the filming area of the projected features of the predefined pattern and are distinct from a red-green-blue (RGB) image captured by each respective one of the depth cameras and (ii) an RGB image of the objects; and
wherein the FVV generator is configured to:
generate, based on the reflected signals off of the objects within the filming area of the projected features of the predefined pattern captured by each of the plurality of depth cameras, a point cloud for each depth camera,
create, based on the plurality of point clouds and anchor points identified for each depth camera during a calibration process, wherein each anchor point is a point on an object placed in front of at least two of the plurality of depth cameras and wherein at least one anchor point of each object has inherently a predefined detectable pattern such that detection of each predefined detectable pattern is possible without employing any of the captured signals that are reflections of any projected feature projected on each anchor point and, correspondingly, identification of each of the at least one anchor point is made without use of any of the captured signals that are reflections of any projected feature projected on each anchor point, a unified point cloud, wherein creating the unified point cloud employs image information from at least one black and white (BW) camera of at least one of the plurality of depth cameras;
mesh points in the unified point cloud to generate a three-dimensional (3D) model of the objects, texture the 3D model based on RGB images captured by the plurality of depth cameras, and render the textured 3D model as a FVV including a series of video frames with respect to a viewpoint;
wherein the depth cameras are unmoving during at least an initial portion of the calibration process and after at least the initial portion of the calibration process during which an initially detected location of at least one of the anchor points is stored, dynamically calibrate the plurality of depth cameras to compensate for small location perturbations of at least one of the plurality of depth cameras by comparing a subsequent detected location of the at least one of the anchor points with the stored initially detected location of the at least one of the anchor points to determine a calibration perturbation.

26. The FVV production system of claim 25, further comprising: at least one projector configured to project a predefined pattern including a large set of features onto the objects within the filming area.

27. A system for rendering free viewpoint video (FVV) based on images captured in a sports arena, comprising:
a processing circuitry; and
a memory, the memory containing instructions that, when executed by the processing circuitry, configure the system to:
cause projection, onto objects in a filming area within the sports arena, of a predefined pattern including a large set of features;
generate, based on signals captured by each of a plurality of depth cameras, a point cloud for each depth camera, wherein the plurality of depth cameras is deployed in proximity to the filming area, wherein the captured signals are reflections off of the objects within the sports arena of the projected features of the predefined pattern and are distinct from a red-green-blue (RGB) image captured by each respective one of the depth cameras;
create, based on the plurality of point clouds and anchor points identified for each depth camera during a calibration process wherein each anchor point is a point on an object placed in front of at least two of the plurality of depth cameras and wherein each object itself has inherently a predefined detectable pattern without projection of any projected feature thereon that is used as one of the anchor points, a unified point cloud, wherein creating the unified point cloud employs image information from at least one black and white (BW) camera of at least one of the plurality of depth cameras;
create, based on the plurality of point clouds and anchor points identified for each depth camera during a calibration process, wherein each anchor point is a point on an object placed in front of at least two of the plurality of depth cameras and wherein at least one anchor point of each object has inherently a predefined detectable pattern such that detection of each predefined detectable pattern is possible without employing any of the captured signals that are reflections of any projected feature projected on each anchor point and, correspondingly, identification of each of the at least one anchor point is made without use of any of the captured signals that are reflections of any projected feature projected on each anchor point, a unified point cloud, wherein creating the unified point cloud employs image information from at least one black and white (BW) camera of at least one of the plurality of depth cameras;
mesh points in the unified point cloud to generate a three-dimensional (3D) model of the objects;
texture the 3D model based on images captured by at least one red-green-blue (RGB) camera of each of the plurality of depth cameras; and
render the textured 3D model as a FVV including a series of video frames with respect to a viewpoint;
wherein the depth cameras are unmoving during at least an initial portion of the calibration process and after at least the initial portion of the calibration process during which an initially detected location of at least one of the anchor points is stored, dynamically calibrate the plurality of depth cameras to compensate for small location perturbations of at least one of the plurality of depth cameras by comparing a subsequent detected location of the at least one of the anchor points with the stored initially detected location of the at least one of the anchor points to determine a calibration perturbation.

28. The system of claim 27, wherein each depth camera comprises: a pair of pattern sensing cameras for capturing the reflected signals and wherein the image information from the at least one red-green-blue (RGB) camera is utilized for the texturing.

29. The system of claim 28, wherein the pattern sensing cameras are black/white cameras with filters adapted to a spectral band of the projected pattern.

30. The system of claim 27, wherein the projection of the predefined pattern is performed by at least one projector.

31. The system of claim 30, wherein a distance at which each of the plurality of depth cameras can capture signals reflected off of the objects in the filming area is based on a light source utilized by the at least one projector.

32. The system of claim 31, wherein the light source is a light emitting diode (LED), wherein the distance from each depth camera to a respective far end of the filming area is at most 20 meters.

33. The system of claim 31, wherein the light source is an extended source.

34. The system of claim 31, wherein the light source is an eye safe laser having a spectral band of between 1.5 and 2 microns.

35. The system of claim 27, wherein the system is further configured to: render the textured 3D model as a continuous sequence of viewpoints along a predetermined path.

36. The system of claim 35, wherein the system is further configured to: produce instant replays from any viewpoint from the continuous sequence of viewpoints.

37. The system of claim 27, wherein the system is further configured to: provide a live producing system allowing for switching during a live event to at least one selected viewpoint, wherein each viewpoint represents a virtual camera having at least a predetermined location and pose.

38. The system of claim 37, wherein the system is further configured to: change a sound based on a location of the at least one selected viewpoint.

39. The system of claim 37, wherein the system is further configured to:
automatically select the at least one viewpoint based on a trained artificial intelligence (AI) model, the viewpoint being selected substantially concurrently with the rendering of the FVV as the series of video frames and the AI model having been trained based on historical selections made by at least one user during production of a previous FVV.

40. The system of claim 37, wherein the at least one selected viewpoint is determined based on at least one user input.

41. The system of claim 27, wherein the system is further configured to: send, in real-time during a sports event, the FVV to at least one recipient device.

42. The system of 28, wherein the system is further configured to: compress the FVV based on a compression ratio, wherein the compression ratio is high for areas of low interest, wherein the compression area is low for areas of high interest.

43. The system of claim 27, wherein a number of depth cameras of the plurality of depth cameras is between 2 and 16.

44. The system of claim 27, wherein the system is further configured to:
detect a human skeleton in any of the plurality of point clouds and the images utilized for the texturing; and
adjust, based on the detected human skeleton, the meshing of the points in the point cloud.

45. A system for rendering free viewpoint video (FVV) based on images captured in a sports arena, comprising:
a processing circuitry; and
a memory, the memory containing instructions that, when executed by the processing circuitry, configure the system to:
generate, based on scanning performed by each of a plurality of depth cameras, a point cloud for each depth camera, wherein the plurality of depth cameras is deployed in proximity to a filming area within the sports arena, wherein the captured signals are reflections off of objects within the filming area of projected features of a predefined pattern and are distinct from a red-green-blue (RGB) image captured by each respective one of the depth cameras;
create, based on the plurality of point clouds and anchor points identified for each depth camera during a calibration process wherein each anchor point is a point on an object placed in front of at least two of the plurality of depth cameras and wherein each object itself has inherently a predefined detectable pattern without projection of any projected feature thereon that is used as one of the anchor points, a unified point cloud, wherein creating the unified point cloud employs image information from at least one black and white (BW) camera of at least one of the plurality of depth cameras;
mesh points in the unified point cloud to generate a three-dimensional (3D) model of the objects;
texture the 3D model based on images captured by at least one red-green-blue (RGB) camera of each of the plurality of depth cameras; and
render the textured 3D model as a FVV including a series of video frames with respect to a viewpoint;
wherein the depth cameras are unmoving during at least an initial portion of the calibration process and after at least the initial portion of the calibration process during which an initially detected location of at least one of the anchor points is stored, dynamically calibrate the plurality of depth cameras to compensate for small location perturbations of at least one of the plurality of depth cameras by comparing a subsequent detected location of the at least one of the anchor points with the stored initially detected location of the at least one of the anchor points to determine a calibration perturbation.

46. The system of claim 45, wherein each depth camera includes a light detection and ranging (LIDAR) scanner and wherein the image information from the at least one red-green-blue (RGB) camera is utilized for the texturing.

47. The system of claim 46, wherein the system is further configured to: dynamically track, by at least one ROI tracking module located in proximity to the filming area, instantaneous ROIs in the filming area; scan, by each LIDAR scanner, an area of each designated ROI; and
create, based on the scanning, the point cloud for each designated ROI at a current video frame.

48. The system of claim of 45, wherein the distance from each depth camera to a respective far end of the filming area is at most 200 meters.

* * * * *